United States Patent
Elsasser et al.

(10) Patent No.: US 6,848,389 B1
(45) Date of Patent: Feb. 1, 2005

(54) SHOCK FORCE INDICATING DEVICE

(75) Inventors: Dan William Elsasser, Sioux Falls, SD (US); Corwyn R. Meyer, Sioux Falls, SD (US)

(73) Assignee: Gateway, Inc., Irvine, CA (US)

( * ) Notice: Subject to any disclaimer, the term of this patent is extended or adjusted under 35 U.S.C. 154(b) by 0 days.

(21) Appl. No.: 10/645,432

(22) Filed: Aug. 21, 2003

(51) Int. Cl.[7] ................................................ G01L 5/00
(52) U.S. Cl. .................... 116/203; 116/212; 116/215
(58) Field of Search ................................. 116/203, 201, 116/212, 215; 206/459.1, 459.5; 73/862.51, 862.49

(56) References Cited

U.S. PATENT DOCUMENTS

| | | | | |
|---|---|---|---|---|
| 2,475,728 A | * | 7/1949 | Smith | 116/203 |
| 2,601,440 A | * | 6/1952 | Kerrigan | 116/203 |
| 2,825,297 A | * | 3/1958 | Harrison | 116/203 |
| 3,021,813 A | * | 2/1962 | Rips | 116/203 |
| 3,369,521 A | * | 2/1968 | Meeder, Jr. | 116/203 |
| 3,373,716 A | * | 3/1968 | Williams | 116/203 |
| 3,515,091 A | * | 6/1970 | Smith | 116/203 |
| 3,707,722 A | * | 12/1972 | Itoh | 116/203 |
| 3,782,204 A | * | 1/1974 | Boardman | 116/203 |
| 3,909,568 A | * | 9/1975 | Greenhut | 116/203 |
| 4,068,613 A | * | 1/1978 | Rubey | 116/203 |
| 4,361,106 A | | 11/1982 | Eklof | |
| 5,046,609 A | * | 9/1991 | Mangini et al. | 206/232 |
| 5,269,252 A | | 12/1993 | Nagai | |
| 5,936,523 A | | 8/1999 | West | |
| 5,982,285 A | | 11/1999 | Bueche et al. | |
| 6,367,408 B1 | | 4/2002 | Gu | |

OTHER PUBLICATIONS

Shockwatch Labels, Aug. 5, 2002.

* cited by examiner

Primary Examiner—Diego Gutierrez
Assistant Examiner—Travis Reis
(74) Attorney, Agent, or Firm—Jeffrey A. Proehl; Leonard & Proehl

(57) ABSTRACT

A shock force indicating device for measuring and visually displaying the extent of a shock force received by an article during handling of the article is disclosed. The device has a cavity formed between a base member and a top member having a raised portion. A bearing is disposed within the cavity. In a preferred embodiment, the top member and the base member provide a compressive force to the bearing such that the bearing is held in place until the device is subjected to a shock force greater than a predetermined threshold. The base member has a pressure sensitive material which provides a visually identifiable path which traces the movement of the bearing when the bearing moves in response to a shock force to the device. The base member may have indicating marks for representing a scale with which to measure a component of a force to the device. The top member is transparent for easy viewing of the indicating marks. The base member may have an adhesive on a bottom portion for attaching the device directly to a package or other article.

22 Claims, 2 Drawing Sheets

SHOCK FORCE INDICATING DEVICE

FIELD OF THE INVENTION

The present invention relates to a shock force indicating device, and more specifically to a shock force indicating device which measures and visually displays the extent of a shock force to an article.

BACKGROUND OF THE INVENTION

Several conventional shock force indicating devices are known and utilized in the shipping and retail industries. These devices, however, do not visually show the extent of shock or force exerted on an article, such as a package or product, during shipping or handling of the article. Many such devices merely inform the user that the package or product has received a shock force that is over a specific, predetermined threshold. For example, one such device has a tiny liquid-filled glass tube housed in a self-adhesive label. If the device receives a shock beyond a predetermined threshold, the liquid in the tube changes from clear to bright red. However, the device is incapable of measuring the extent of shock to the package or product.

Additionally, U.S. Pat. No. 4,361,106, issued to Eklof, discloses a non-resettable shock force indicating device. The device has a circular bottom plate having a flange around its edge. There is a circular top section that is spaced apart from the inner surface of the circular plate and attached to the free edge portion of the flange. A top portion has a dome portion with a central axis and a peripheral side wall portion. The dome portion forms a chamber. The chamber is confined by a spring plate acting perpendicular to its extension. A central support column is directed perpendicular to the plate. The free end of the support column is cupular and provides a guiding support for a ball abutting the inner surface of the enlargement. The plate has openings such that spoke-like arms extend to the support column thereby rendering the plate spring-active in its perpendicular direction adjacent to the column. The cupular end presses against the ball which in turn presses against the inner surface of the dome portion. If the device is subjected to shock force greater than a predetermined threshold, the ball is dislodged from its normal position on the column. The column is displaced towards the upper inner surface of the dome portion by influence of the spring plate. The column serves as a blocking means for the ball to be returned to its normal position. While the device may indicate that a product has received a shock force over a predetermined threshold, the device is incapable of visually identifying the extent of shock to an article.

Another such conventional shock force indicating device comprises two sets of spring loaded steels balls disposed within a rugged transparent housing. The springs are calibrated to withstand forces up to the grating of the unit. If impacts greater than the rated value are imposed, at least one set of balls will be dislodged and dropped into a transparent zone for visual identification. While the device may also indicate that a product has received a shock force over a predetermined threshold, the device is incapable of measuring the extent of shock to the package or product.

Furthermore, U.S. Pat. No. 5,269,252, issued to Nagai, discloses a shock sensor which is able to detect an externally applied acceleration and which is designed to prevent the indicating means from reversing direction when a force in the opposite direction of detection is applied. The device may be affixed to an object by a screw. The device has an upper supporting member provided with a weight and a lower supporting member provided with a visible indicating plate. The upper and lower supporting members move independently of one another and are supported by a U-shaped fixing member. There is a V-shaped groove on a side face of the fixing member. The supporting members are designed to be in a higher position than the V-shaped groove such that a spring is bent upward into an arc-like shape. When the device is subjected to a downward G force greater than a predetermined value, the spring buckles from the upward arc-like shape to a downward arc-like shape. The ends of the supporting members also move downward and are maintained in the downward position by a downward elastic pressing force generated by the spring portion. In this position, the brightly colored indicating plate of the lower supporting member is visible through a transparent window. The indicating plate allows an individual to confirm that the product has been subjected to a force greater than a predetermined value. However, the device does not allow someone to visually confirm to what extent a package or product has been subjected to a force or shock.

Other conventional shock force indicating devices are capable of informing an individual of the extent of shock, however, they require one to download such information from the device and therefore, the extent of shock information is not readily ascertainable upon visual inspection. Therefore, an individual receiving a package at his home could not visually inspect the package and immediately make a decision to refuse or accept the package based on the device. For example, U.S. Pat. No. 5,982,285, issued to Bueche et al, discloses a shock force indicating device having a signal processing circuit disposed within a housing. The housing has side walls, a removable end wall, and a connection face. A plurality of screws couple the end wall with a side wall. An individual may access the circuit by removing the screws. The connection face provides a connection to an external sensor assembly and to a personal computer assembly. The external sensor assembly has sensor modules that are connected to respective mounting blocks. The mounting blocks are configured to stack one atop the other with the block positioned against the connection face of housing. The device is capable of monitoring impact via an accelerometer, and also temperature and humidity with alternate sensors. The sensor and time data must be downloaded onto a PC to determine the extent of shock on an article. Such information is not available upon visual inspection and the process for obtaining such data is very time consuming and often impractical for typical receiving situations.

Furthermore, U.S. Pat. No. 5,936,523, issued to West, discloses a device having an acceleration sensor which is capable of sending an output to a reporting unit and decoder. The reporting unit monitors a signal from the acceleration sensor for evidence of excessive acceleration from the mishandling of an article. The device is also incapable of displaying data as to the extent of shock to an article by simple visual inspection and requires time-consuming manipulation of the device.

Therefore, it would be advantageous to provide a shock force indicating device capable of measuring and displaying the extent of a shock force to an article.

SUMMARY OF THE INVENTION

In view of the deficiencies described above, it is an object of the present invention to provide a shock force indicating device capable of measuring and displaying the extent of a shock force to an article.

The present invention is a shock force indicating device for measuring and immediately displaying the extent of a shock force on an article, such as a package or product, during shipping or other handling of the article. The shock force indicating device comprises a base member having a substantially flat top surface. A top member having a raised portion is disposed in spaced relation above the base member such that a cavity is formed between the top member and the base member. A bearing is disposed within the cavity. The base member may contain an adhesive on a bottom surface of the base member for attaching the device directly to an article such as a package. Optionally, the device may be included within or on a packaged product to measure the extent of a shock force to the device.

In one preferred embodiment, the base member and top member provide a compressing force to the bearing such that the bearing is held in place until the device is subjected to a shock force exceeding a predetermined threshold. The bearing has a starting point, in one embodiment, which is substantially centered in the plane of the base member within the device between the base member and the top member. In another embodiment, the bearing is disposed within an indentation in the base member. When the device is subjected to a shock force greater than a predetermined threshold, the bearing will travel a particular distance from its starting position and will visually identify the extent of the shock force.

To visually display the extent of the shock force, there is a pressure sensitive material disposed on the base member. Movement of the bearing over the pressure sensitive material provides a visually identifiable path on the pressure sensitive material which traces the movement of the bearing when the bearing moves in response to a shock force to the device. The pressure sensitive material may be pressure sensitive paper, such as carbon paper, but is optionally any other suitable material. The base member has indicating marks which represent a scale with which to measure a component of a force applied to the device. The indicating marks may consist of substantially concentric circles. The top member is transparent for easy viewing of the indicating marks.

The top member preferably has a substantially flat top portion or is optionally dome-shaped. When the top member is flat, substantially the same amount of force moves the bearing the same distance regardless of its starting point. When the top member is dome-shaped, the further the bearing is from a starting point within the device, the greater the amount of shock force which is necessary to move the is bearing a particular distance.

In one embodiment, the bearing is connected to one end of a spring while the opposite end of the spring is connected to the base member. The spring is adapted to allow a predetermined amount of movement of the bearing when the device is subjected to a shock force of a particular magnitude. Optionally, the bearing and the spring are formed from a single piece of an elastic material. In yet another embodiment, the bearing is connected to one end of an elastic member while the opposite end of the elastic member is connected to the base member. The elastic member is adapted to allow a predetermined amount of movement of the bearing when the device is subjected to a shock force of a particular magnitude.

In another embodiment, the bearing is formed from a material such as graphite which is capable of visually identifying a path which traces the movement of the bearing when the bearing moves in response to a shock force to the device. In yet another embodiment, the base member has a plurality of spaced apart raised ridges. When the device is subjected to a force, the bearing travels over a number of the spaced apart ridges. The number of ridges the bearing travels over corresponds to the extent of the shock force on the device, and may indicate a cumulative amount of shock.

In yet another embodiment of the device, a channel narrows in width along a length of the channel. Within the channel, the bearing travels a predetermined distance when the device is subjected to a shock force beyond a predetermined threshold. The further the bearing is from a starting point within the channel, the greater the amount of shock force which is necessary to move the bearing a particular distance.

Other features and advantages of the invention will be apparent from the following detailed description taken in conjunction with the following drawings.

DETAILED DESCRIPTION OF THE INVENTION

Figure 1:
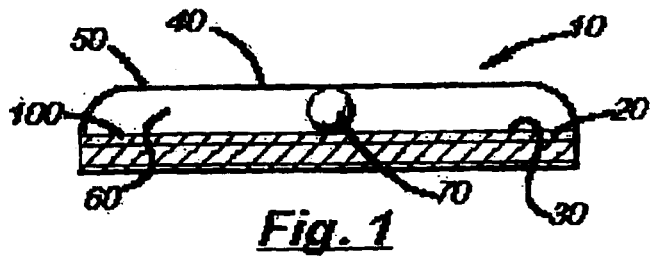
FIG. 1 is a preferred embodiment of the present invention.
Figure 2:
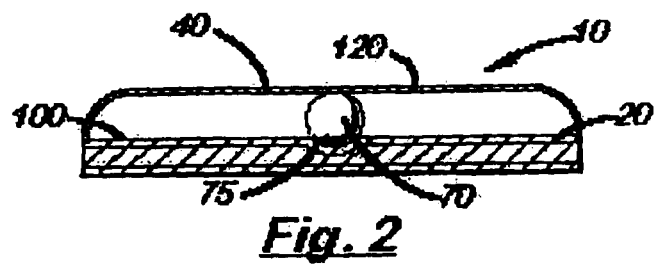
FIG. 2 is another preferred embodiment of the present invention.
Figure 3:
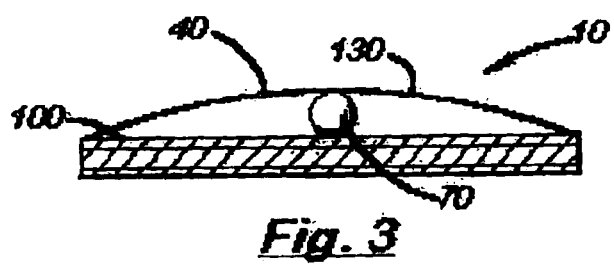
FIG. 3 is yet another preferred embodiment of the present invention.
Figure 4:
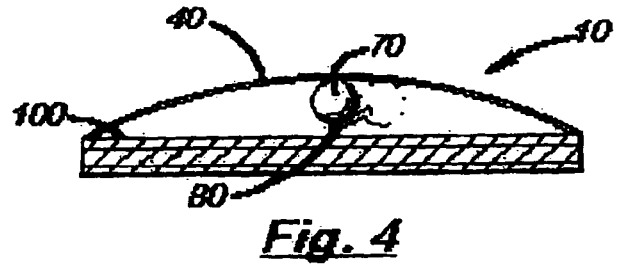
FIG. 4 is yet another preferred embodiment of the present invention.
Figure 5:
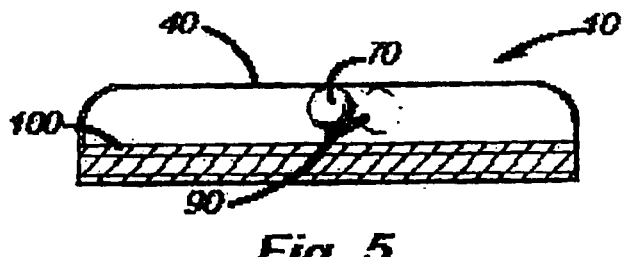
FIG. 5 is yet another preferred embodiment of the present invention.
Figure 6:
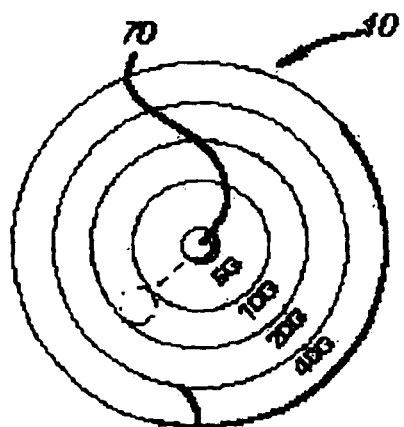
FIG. 6 is yet another preferred embodiment of the present invention.
Figure 7:
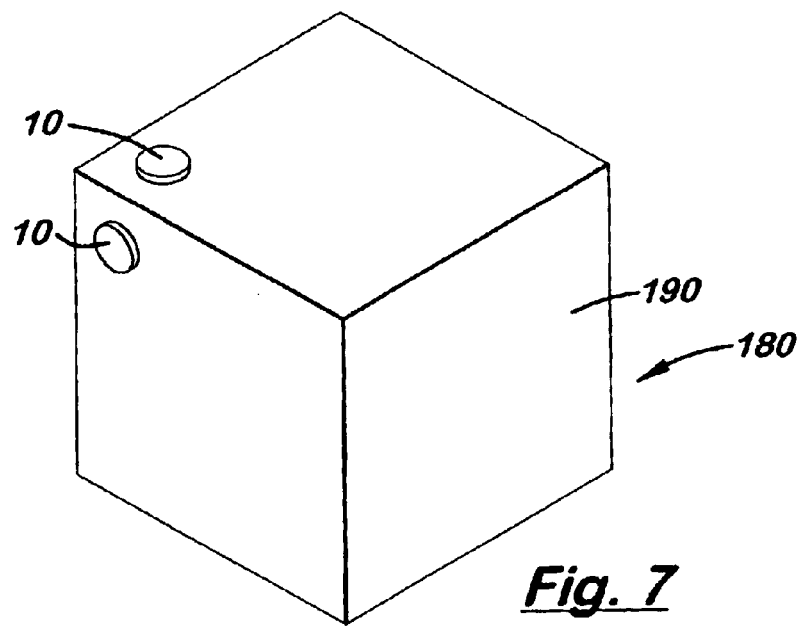
FIG. 7 is yet another preferred embodiment of the present invention.
Figure 8:
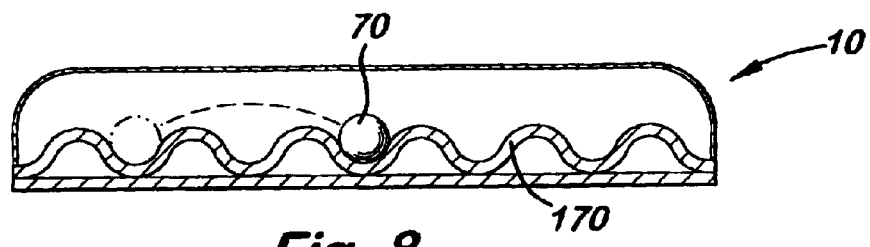
FIG. 8 is still another preferred embodiment of the present invention.
Figure 9:
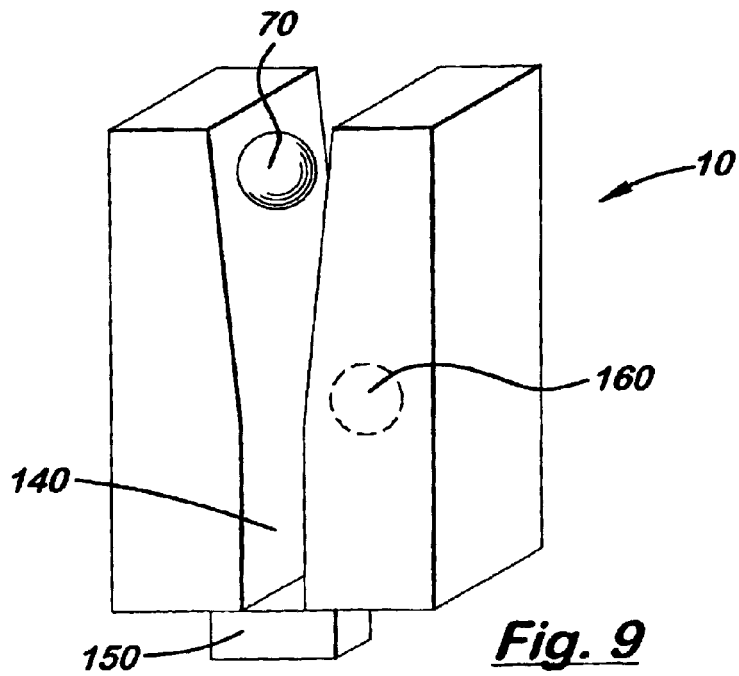
FIG. 9 is yet still another preferred embodiment of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention is a shock force indicating device 10 for measuring and immediately displaying the extent of a shock force on an article, such as a package or product, during shipping or handling of the article. The device 10 is optionally applied to the outside of a package via an adhesive backing or other suitable means. Alternatively, the device 10 is optionally placed inside packaging with the product or is adhered to the product itself. The device 10 improves the handling of shipped products or of any other product requiring careful handling because the device 10 provides an immediate visual indication of the extent of any mishandling of the product. Furthermore, the device 10 aids in reducing administrative costs for businesses because, upon the receipt of a mishandled package a consumer can immediately refuse the package by visually inspecting the device 10. The consumer can subsequently refuse to accept the article rather than receive the article and subsequently expend both his or her time and administrative time to facilitate return of the mishandled package.

The shock force indicating device 10 has a base member 20 having a substantially flat top surface 30. A top member 40 having a raised portion 50 is disposed in spaced relation above the base member 20 such that a cavity 60 is formed between the top member 40 and the base member 20. A bearing 70 is disposed within the cavity 60. The top member 40 is preferably mounted on a top of the base member 20 via an adhesive, but any other means of adjoining the top member 40 to the base member 20 is used. For example, the device 10 optionally has at least one spring disposed between the base member 20 and the top member 40 at a peripheral edge of the device 10 which provides the necessary compressing force. The device 10 has a substantially circular perimeter, in some embodiments.

In one preferred embodiment, the base member 20 and top member 40 provide a compressing force to the bearing 70 such that the bearing 70 is held in place until the device 10 is subjected to a shock force exceeding a predetermined threshold. Preferably, the bearing 70 has a starting position which is substantially centered within the plane of the base member 20 between the base member 20 and the top member 40. In another embodiment, the bearing 70 is disposed within an indentation 75 in the base member 20 which is preferably substantially centered within the device 10 between the base member 20 and the top member 40. When the device 10 is subjected to a shock force greater than a predetermined threshold, the bearing 70 will travel a particular distance from its starting point and will visually identify the extent of the shock force.

In one embodiment, the bearing 70 is connected to a spring 80 on one end of the spring 80 and the opposite end of the spring 80 is connected to the base member 20. Preferably, the spring 80 is connected to the base member 20 at a point which is substantially centered within the device 10 between the base member 20 and the top member 40. The spring 80 is adapted to allow a predetermined amount of movement of the bearing 70 when the device 10 is subjected to a force of a particular magnitude. When the shock force subsides, the spring 80 returns to its starting position. The bearing 70 and the spring 80 may be formed from a single piece of an elastic material or any other suitable material having a memory.

In yet another embodiment, the bearing 70 is connected to an elastic member 90 on one end of the elastic member 90 and the opposite end of the elastic member 90 is connected to the base member 20. The elastic member 90 is also adapted to allow a predetermined amount of movement of the bearing 70 when the device 10 is subjected to a shock force of a particular magnitude. When the shock force subsides, the elastic member 90 may retract back to its starting position.

It is understood that the shock indicating device 10 the present invention is adapted to measure the base component of a force applied to the device 10. For example, the device 10 is capable of registering the extent of a shock force in two directions on an x, y plane of the device 10. It is also understood that the term "shock force" refers to an impact which causes a sudden change in velocity or acceleration of the device 10 or of the article on which the device 10 is placed.

To visually display the extent of a shock force to the device 10, a pressure sensitive material 100 is disposed on the base member 20. Movement of the bearing 70 over the pressure sensitive material 100 provides a visually identifiable path on the pressure sensitive material 100 which traces the movement of the bearing 70 when the bearing 70 moves in response to a shock force to the device 10. The pressure sensitive material 100 may be pressure sensitive paper, such as carbon paper, but is optionally any other suitable material. The base member 20 has indicating marks 110 which represent a scale with which to measure a component of a force applied to the device 10. For example, the indicating marks 110 are optionally 5 G, 10 G, 15 G, 20 G, and 40 G in concentric circles. The indicating marks 110 may be substantially concentric circles. The top member 40 is transparent for easy viewing of the indicating marks 110.

The top member 40 may have a substantially flat top portion 120 or is optionally dome-shaped 130. When the top member 40 has a substantially flat top portion 120, substantially the same amount of force moves the bearing 70 a corresponding equal amount of distance throughout the device 10. When the top member 40 is dome-shaped 130, the further the bearing 70 is from its starting point within the device 10, the greater the amount of shock force which is necessary to move the bearing 70 a particular distance. For example, a initial shock force of 10 G may move the bearing 70 twenty millimeters. Due to the dome-shape 130 of the top member 40, the device 10 may require 20 G of force to move the bearing 70 a subsequent twenty millimeters.

In another embodiment, the bearing 70 is formed from a material which is capable of visually identifying a path on the base member 20 which traces the movement of the bearing 70 when the device 10 is subjected to a shock force. Preferably, the bearing 70 is graphite, but may alternatively consist of other suitable materials.

In yet another embodiment, a channel 140 is provided which narrows in width along a length of the channel 140. Within the channel 140, the bearing 70 travels a predetermined distance when the device 10 is subjected to a force beyond a predetermined threshold. The further the bearing 70 is from a starting point within the channel 140, the greater the force necessary to move the bearing 70 a particular distance. Preferably, the device 10 further comprises a mechanism 150 such as a weight having a pivot point 160 which aligns the channel 140 in the direction of the force component.

In an alternate embodiment, the base member 30 has a plurality of spaced apart raised ridges 170. When the device 10 is subjected to a force, the bearing 70 travels over a number of the spaced apart ridges 170. The number of ridges 170 the bearing 70 travels over corresponds to the extent of the shock force to the device 10.

In yet another embodiment, the present invention includes a system 180 for visually identifying the extent of a shock force to the device 10 in multiple directions. The system 180 comprises an article 190 having at least two non-parallel sides and at least two shock force indicating devices 10. Each of the devices 10 comprises a base member 20 having a substantially flat top surface 30 and a top member 40 having a raised portion 50 in spaced relation above the base member 20. The base member 20 and top member 40 form a cavity 60. A bearing 70 is disposed within the cavity 60 and a pressure sensitive material 100 is disposed on the base member 20. Movement of the bearing 70 over the pressure sensitive material 100 provides a visually identifiable path on the pressure sensitive material 100 which traces the movement of the bearing 70 when the bearing 70 moves in response to a shock force to the device 10. In the system 180, the devices 10 are placed on the article 190 in multiple locations such that a force in any direction will register a base component on at least one of the devices 10. For example, two devices 10 are optionally placed on a top portion and a side portion of a standard shipping box such that the devices 10 will register a base component of a force in at least one of an x, y, and z direction.

While the specific embodiments have been illustrated and described, numerous modifications come to mind without significantly departing from the spirit of the invention, and the scope of protection is limited by the scope of he accompanying claims.

What is claimed is:

1. A shock force indicating device comprising:
   a base member having a substantially flat top surface;
   a top member having a raised portion disposed in spaced relation above said base member forming a cavity between said top member and said base member;
   a bearing disposed within said cavity; and
   a pressure sensitive material disposed on said base member;
   wherein movement of said bearing over said pressure sensitive material produces a visually identifiable path on said pressure sensitive material tracing movement of said bearing when said bearing moves in response to a shock force on said device;
   wherein said base member and said top member provide a compressive force to said bearing such that said bearing is held in place until said device is subjected to a shock force greater than a predetermined threshold.

2. The shock force indicating device according to claim 1, wherein a bottom surface of said base member comprises an adhesive backing.

3. The shock force indicating device according to claim 1, wherein said bearing has an initial starting position which is substantially centered within a plane of said base member within said device between said base member and said top member.

4. The shock force indicating device according to claim 1, wherein said top member has a substantially flat top portion.

5. The shock force indicating device according to claim 1, wherein said top member is dome-shaped.

6. The shock force indicating device according to claim 1, wherein said pressure sensitive material is pressure sensitive paper.

7. The shock force indicating device according to claim 6, wherein said pressure sensitive paper is carbon paper.

8. The shock force indicating device according to claim 1, wherein said top member is substantially transparent.

9. The shock force indicating device according to claim 1, wherein said base member comprises indicating marks representing a scale with which to measure a component of a shock force on said device.

10. The shock force indicating device according to claim 9, wherein said indicating marks are substantially concentric circles.

11. The shock force indicating device according to claim 1, wherein said device has a substantially circular perimeter.

12. A shock force indicating device comprising:
    a base member having a substantially flat top surface;
    a top member having a raised portion disposed in spaced relation above, said basic member forming a cavity between said top member and said base member;
    a bearing disposed within said cavity; and
    a pressure sensitive material disposed on said base member;
    wherein movement of said bearing over said pressure sensitive material produces a visually identifiable path on said pressure sensitive material tracing movement of said bearing when said bearing moves in response to a shock force on said device;
    wherein said bearing is disposed within an indentation in said base member under an initial condition, said bearing traveling out of the indentation when said device is subjected to a sufficient shock force.

13. A shock force indicating device comprising:
    a base member having a substantially flat top surface;
    a top member having a raised portion disposed in spaced relation above said base member forming a cavity between said top member and said base member;
    a bearing disposed within said cavity; and
    a pressure sensitive material disposed on said base member;
    wherein movement of said bearing over said pressure sensitive material produces a visually identifiable path on said pressure sensitive material tracing movement of said bearing when said bearing moves in response to a shock force on said device;
    a spring, one end of said spring being connected to the base member at a substantially centered location on the top surface of said base member, an other end of said spring being connected to said bearing, said spring adapted to allow a predetermined amount of movement of said bearing when said device is subjected to a shock force of a particular magnitude.

14. The shock force indicating device according to claim 13, wherein said bearing and said spring are formed from a single piece of an elastic material.

15. A shock force indicating device comprising:
    a base member having a substantially flat top surface;
    a top member having a raised portion disposed in spaced relation above said base member forming a cavity between said top member and said base member;
    a bearing disposed within said cavity; and
    a pressure sensitive material disposed on said base member;
    wherein movement of said bearing over said pressure sensitive material produces a visually identifiable path on said pressure sensitive material tracing movement of said bearing when said bearing moves in response to a shock force on said device;
    an elastic member, one end of said elastic member being connected to said base member at a substantially centered location on the top surface of said base member, an other end of said elastic member being connected to said bearing, said elastic member adapted to extend to allow movement of said bearing when said device is subjected to a shock force of a particular magnitude.

16. A shook force indicating device comprising:
    a base member having a substantially flat top surface;
    a top member having a raised portion disposed in spaced relation above said base member forming a cavity between said top member and said base member; and
    a bearing disposed within said cavity;
    wherein said bearing is formed of a material capable of visually marking said base member such that said bearing traces a path which has a length corresponding to a base component of a force applied on said device;
    wherein said base member and said top member provide a compressive force to said bearing such that said bearing is held in place unless said device is subjected to a shock force greater than a predetermined threshold.

17. The shock force indicating device according to claim 16, wherein the base member has indicating marks representing a scale with which to measure a component of a shock force on said device.

18. A shock force indicating device comprising:
a base member having a substantially flat top surface;
a top member having a raised portion disposed in spaced relation above said base member forming a cavity between said top member and said base member;
a bearing disposed within said cavity; and
a spring, one end of said spring being connected to the base member at a substantially centered location on the too surface of said base member, an other end of said spring being connected to said bearing, said spring adapted to allow a predetermined amount of movement of said bearing when said device is subjected to a shock force of a particular magnitude;
wherein said bearing is formed of a material capable of visually marking said base member such that said bearing traces a patch which has a length corresponding to a base component of a force applied on said device.

19. The shock force indicating device according to claim 18, wherein said bearing and said spring are formed from a single piece of an elastic material.

20. A shock force indicating device comprising:
a base member having a substantially flat top surface;
a top member having a raised portion disposed in spaced relation above said base member forming a cavity between said top member and said base member;
a bearing disposed within said cavity; and
an elastic member, one end of said elastic member being connected to the base member at a substantially centered location on the top surface of said base members an other end of said elastic member being connected to said bearing, said elastic member adapted to extend to allow movement of said bearing when said device is subjected to a shock force of a particular magnitudes;
wherein said bearing is formed of a material capable of visually marking said base member such that said bearing traces a path which has a length corresponding to a base component of a force applied on said device.

21. A shock force indicating device comprising:
a base member having a top surface;
a top member having a raised portion disposed in spaced relation above said base member forming a cavity between said top member and said base member;
a bearing disposed within said cavity; and
a pressure sensitive material disposed on the top surface of said base member such that movement of said bearing over said pressure sensitive material produces a visually identifiable path on said pressure sensitive material tracing movement of said bearing when said bearing moves in response to a shock force on said device;
wherein said top member has a concave lower surface such that a distance between the top surface of said base member and the concave lower surface of said top member decreases in a radially outward direction from a substantially centered position on the top surface of said base member so that movement of said bearing outwardly from a substantially centered position on said base member requires progressively greater shock force on said device.

22. The shock force recording device according to claim 21 wherein said distance between the top surface of said base member and the lower surface of said top member at said substantially centered position is substantially equal to a diameter of said bearing.

* * * * *